United States Patent [19]
Mayer

[11] Patent Number: 5,206,599
[45] Date of Patent: Apr. 27, 1993

[54] CAPACITANCE SENSOR FOR MEASURING THICKNESS OF BLOWN FILM INCLUDING A COLLAPSING FRAME AND A PAIR OF LINEAR MOTOR ASSEMBLIES

[75] Inventor: Daniel W. Mayer, St. Paul, Minn.

[73] Assignee: Modern Controls, Inc., Minneapolis, Minn.

[21] Appl. No.: 739,176

[22] Filed: Aug. 1, 1991

[51] Int. Cl.$^5$ .................. G01R 27/26; G01B 7/08
[52] U.S. Cl. .................................. 324/671; 324/663; 264/40.1
[58] Field of Search ............ 324/558, 559, 658, 663, 324/671, 686, 690, 673; 264/524, 532, 40.1, 40.2; 425/326.1, 529, 530, 535

[56] References Cited

U.S. PATENT DOCUMENTS 3,300,716  1/1967  Engert .............................. 324/673
4,339,403  7/1982  Upmeier et al. ................ 425/326.1
4,947,131  8/1990  Mayer et al. ...................... 324/671

OTHER PUBLICATIONS

Parke, "Linear Motor Systems", pp. D1–D6.

Primary Examiner—Gerard R. Strecker
Assistant Examiner—Diep Do
Attorney, Agent, or Firm—Palmatier, Sjoquist & Helget

[57] ABSTRACT

A sensor system for measuring the thickness of blown film, by mounting a linear motor system on either side of a collapsing frame to permit the linear travel of a forcer element substantially across the width of the collapsing frame. A sensor is affixed to the forcer element and is positioned in close contact with blown film surface, to provide a plurality of measurement samples of thickness during the traversal of the linear motor across the blown film surface.

7 Claims, 2 Drawing Sheets

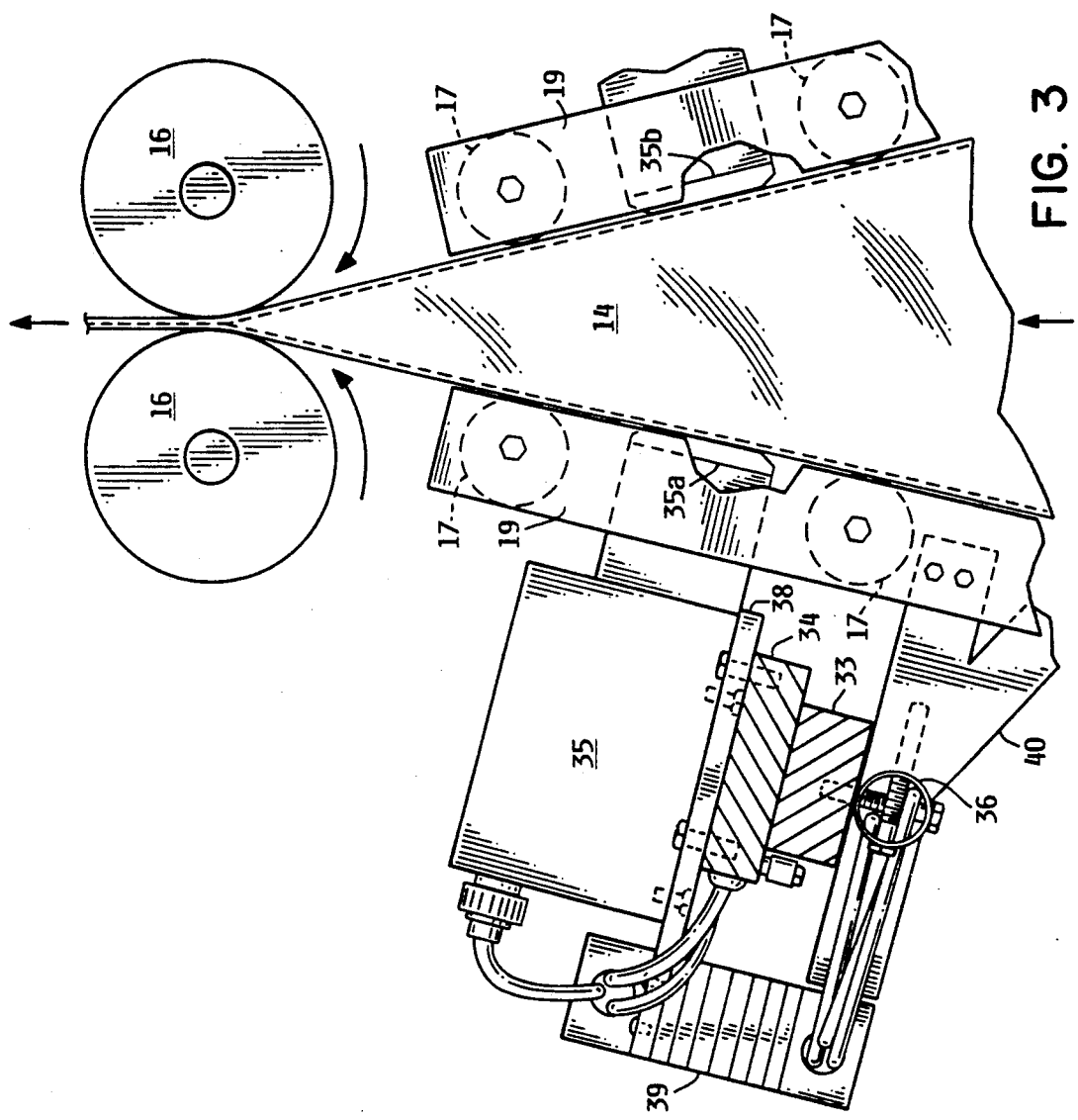

CAPACITANCE SENSOR FOR MEASURING THICKNESS OF BLOWN FILM INCLUDING A COLLAPSING FRAME AND A PAIR OF LINEAR MOTOR ASSEMBLIES

BACKGROUND OF THE INVENTION

This invention relates to an apparatus for measuring the thickness of plastic film made by the blown film process, wherein a plastic film bubble is created by extrusion of plastic through a circular die, and the bubble is subsequently collapsed in an "A" frame assembly, and fed through a series of rollers through one or more collection points.

Machines for producing plastic film by the blown film process operate generally on the principle of producing a plastic bubble by means of air interaction with molten plastic through a narrow annular die gap. The die gap is typically formed by the concentric positioning of two dies so as to provide an intermediate annular gap therebetween. The plastic bubble which is created by the machine is usually collapsed in the region above the die, by pulling the plastic film through a collapsing "A" frame, wherein a gap at the top of the frame permits the film to be passed through the frame and over a series of rollers. At least one set of these rollers is driven by a motor which has a controllable rotational speed, wherein the thickness of the plastic film may be controlled by varying the rotational speed of the motor, thereby varying the rotational speed of the rollers and the linear movement of the plastic film as it is collected. The film which is produced by this machine is then passed over a series of further rollers and edge cutters, and is ultimately collected on take-up reels for storage and disposition.

A continuing problem with machines of the type described herein is the problem of maintaining a film thickness within relatively narrow tolerances, and the further problem of correcting film thickness variations without excessive waste of film. Under optimum conditions it is desirable to adjust the correct thickness of the plastic film to be produced within a very short time after starting up the machine, i.e., within five to ten minutes. However, this requires that film thickness measurements be made very quickly in order for machine adjustments to be made, and in the prior art it has been very difficult to obtain a quick measurement of average film thickness. Plastic film as manufactured by these machines are typically made in thicknesses ranging from 0.001 to 0.010 inch (1-10 mils), and it is desirable to/control the thickness to ±3% or better. Film thickness is typically controlled by sensors which monitor the film as it is formed into the plastic bubble, and circuits which convert the sensor signals to motor drive signals to vary the speed of the haul-off rollers; i.e., the motor-driven rollers which pull the film through the collapsing frame. The haul-off rollers may be increased in speed in order to produce a thinner film, and decreased in speed in order to produce a thicker film.

A further problem with machines utilized in the blown film process, is the problem of localized imperfections or variations in the die, which produces localized regions of thicker or thinner film. Any die which utilizes an annular gap for producing film will invariably have variations in gap dimensions; a gap variation of only a few percent over a localized region is unacceptable, particularly when one considers that the film produced by the machine is collected on rollers, and a localized unevenness in the film will create a cumulative thickness as the take-up roller is filled. This leads to a lumpy and unstable roll of the finished product. This problem has been at least partially solved by rotating the die as the machine is operated, to essentially distribute imperfections about the circumference of the bubble, so that a buildup of thicker or thinner film material will not distort the take-up roll. In a typical machine, the die is rotated at a very slow rate, usually at about 3-10 minutes per revolution. Alternatively, some machines have mechanisms for rotating the "A" frame instead of the die. The blown film bubble moves at a linear speed in the range of 50-300 feet per minute, and therefore an imperfection in film thickness caused by the die gap will be distributed more or less evenly across the plastic film sheet which is ultimately placed on a take-up roll.

In compensating for film thickness variations, a thickness sensor placed against the outer surface of the bubble can provide an instantaneous measurement of thickness at its localized position. By virtue of rotation of the die, a thickness sensor will eventually measure the film thickness of the entire circumference of the bubble, because the film produced by the die will eventually move past the sensor. However, since the die is rotating at a relatively slow angular rate, a film thickness measurement of the entire circumference will require some 3-10 minutes of operation, during which time 100-3,000 feet of film may have been manufactured. If the overall average film thickness is measured, and is found to be outside permissible limits, the rotational speed of the haul-off rollers can be controlled, but at the cost of producing a considerable amount of film outside of specifications. In the prior art, this problem has been addressed by mounting a sensor for measuring thickness on a circular trolley, and transporting the sensor about the bubble at the same time as the bubble is being formed. The rate of rotation of the sensor about the bubble is typically controlled at 2-6 minutes per revolution, thereby permitting a complete measurement of thickness of the entire bubble to be made within a much shorter period of time. While this does reduce the response time required by the system for correcting film thickness errors, it requires the additional expense of constructing the circular trolley system for the sensor. Further, since the relative movement of both sensor and the plastic film bubble occurs while the sensor measurements are being made, measurement errors may be caused by the failure of the sensor to maintain close contact with the film bubble.

In systems of the foregoing type, the optimum placement of a circular trolley for holding a sensor is at a position between the die and the collapsing frame, where the bubble is still generally circular in shape. The temperature of the bubble in this region is much higher than the bubble temperatures found at a greater distance from the die, and particularly is much greater than the temperatures of the bubble in the collapsing frame. Therefore, temperature variations create additional problems, requiring that the thickness sensor be capable of operating at a higher temperature, and increasing the accumulation of additives and waxes which necessarily form during the process. These materials are by-products of the blown film production, and have a tendency to fill the gaps in the thickness sensor, to thereby distort or destroy the sensor readings. In addition, the temperature of the bubble varies considerably at different points about the bubble circumference, and therefore the sensor must be capable of producing stable thickness measurements around the circumference of the bubble in spite of temperature variations around the circumference.

SUMMARY OF THE INVENTION

The present invention utilizes the collapsing frame of a blown film machine as a support structure for mounting a pair of linear tracking motors and thickness sensors. The linear tracking motor and sensor assembly is positioned on the collapsing frame, preferably at a position near the apex of the "A" frame structure. The collapsing frame changes the shape of the blown film material from a cylindrical cross section to a rectangular cross section, and each linear tracking motor is driven along a path parallel in the elongated sides of the rectangular cross section. A thickness sensor mounted on the tracking motor contacts the blown film surface and provides an accurate and repetitive measure of film thickness.

It is the principal object of the present invention to provide a film thickness measuring system for accurately gauging film thickness.

It is another object of the present invention to provide a thickness measurement system wherein thickness measurements may be made at frequent sampling intervals.

It is another object of the present invention to provide a thickness measuring system wherein the sensor positions may be rapidly changed, thereby providing thickness measurement readings at a high rate of sampling frequency.

It is another object to provide a movable sensor which operates more effectively than prior art movable sensor systems.

The foregoing and other objects and advantages of the present invention will become apparent from the following specification and claims, and with reference to the drawings.

BRIEF DESCRIPTION OF THE DRAWINGS

FIG. 3 shows an expanded view of a portion of FIG. 1.

DESCRIPTION OF THE PREFERRED EMBODIMENT

Figure 1:
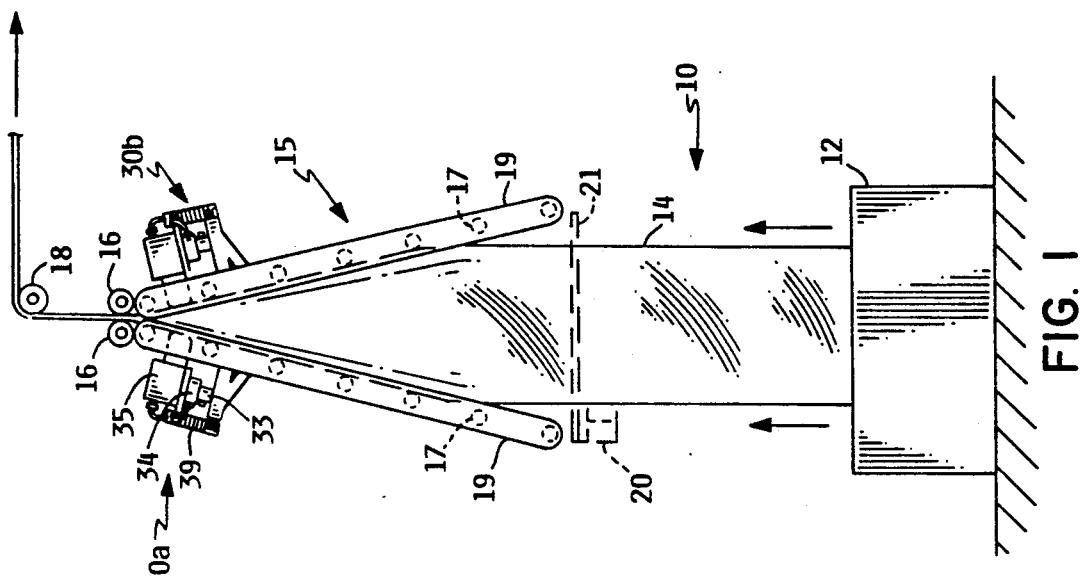
FIG. 1 shows a side elevation view of a blown film machine having the invention attached thereto.

Referring first to FIG. 1, the invention is shown mounted on a representative blown film thickness machine 10. Machine 10 may be of substantial size; i.e., it may extend a distance of more than 25 feet upwards from a floor-mounting position. The lower portion of machine 10 consists of a die or extruder 12 through which molten plastic is forced under the influence of pressurized air to form an annular film which emerges from the extruder 12 in the form of a plastic bubble 14. Bubble 14 moves upwardly during the manufacturing process. An "A" frame, or a collapsing frame 15 collapses the cylindrical bubble 14 and forces the collapsed bubble through an upper elongated opening in the collapsing frame 15, wherein the film bubble passes between a pair of pinch rollers 16 which are driven by an external motor drive system. Pinch rollers 16 pull the film upwardly and out of the machine, wherein the film is thereafter guided over a series of rollers 18 to a collection drum (not shown). The collapsed film bubble may be passed through a station whereby the edges are trimmed by knife, to form two separate plastic film sheets.

FIG. 1 shows a form of prior art thickness sensor 20 in dotted outline form. Thickness sensor 20 is typically mounted on a circular rail 21 and is permitted to travel about the cylindrical film bubble 14 for making thickness measurements. Because of difficulty in controlling the measurement and position tolerances in the prior art device, the prior art sensor is movable about the circumference of the film bubble at a relatively slow rate; i.e., approximately 2–6 minutes are required for a complete transit of the circumference by the sensor. Under difficult prior art operating procedures the sensor makes sample measurements as it transits about the circumference, and after each complete transit a calculation of average thickness is made. If the calculation of average thickness reveals an out-of-tolerance condition, control signals may be generated to adjust the die or extruder 12 to compensate for this out-of-tolerance condition. Unfortunately, all the while the sensor measurements and calculations are being made, the blown film bubble is exiting from the machine at a linear travel rate of 100–200 feet per minute, and an out-of-tolerance film thickness correction cannot be made sufficiently fast to avoid the production of a significant length of plastic film during the time measurements are being made and corrective action is being taken. This is one of the most significant problems with the prior art ring sensor device.

A further problem with prior art devices is caused by temperature variations of the plastic film bubble itself. The plastic film exits the die or extruder 12 at a high temperature, and progressively cools as it travels upwardly under the influence of air pressure. Therefore, the closer the sensor device is placed to the extruder die 12, the higher will be the film bubble temperature, and the greater will be the temperature variations about the circumference of the film. Furthermore, the film itself is relatively less stable until it reaches a sufficient cooling temperature, and therefore care must be taken to avoid placing too much contact force on the film sensor against the film itself. All of these variables introduce unreliability into measurements taken along the lower portion of the film bubble, and the variables become progressively less troublesome as the film progresses upwardly.

Figure 2:
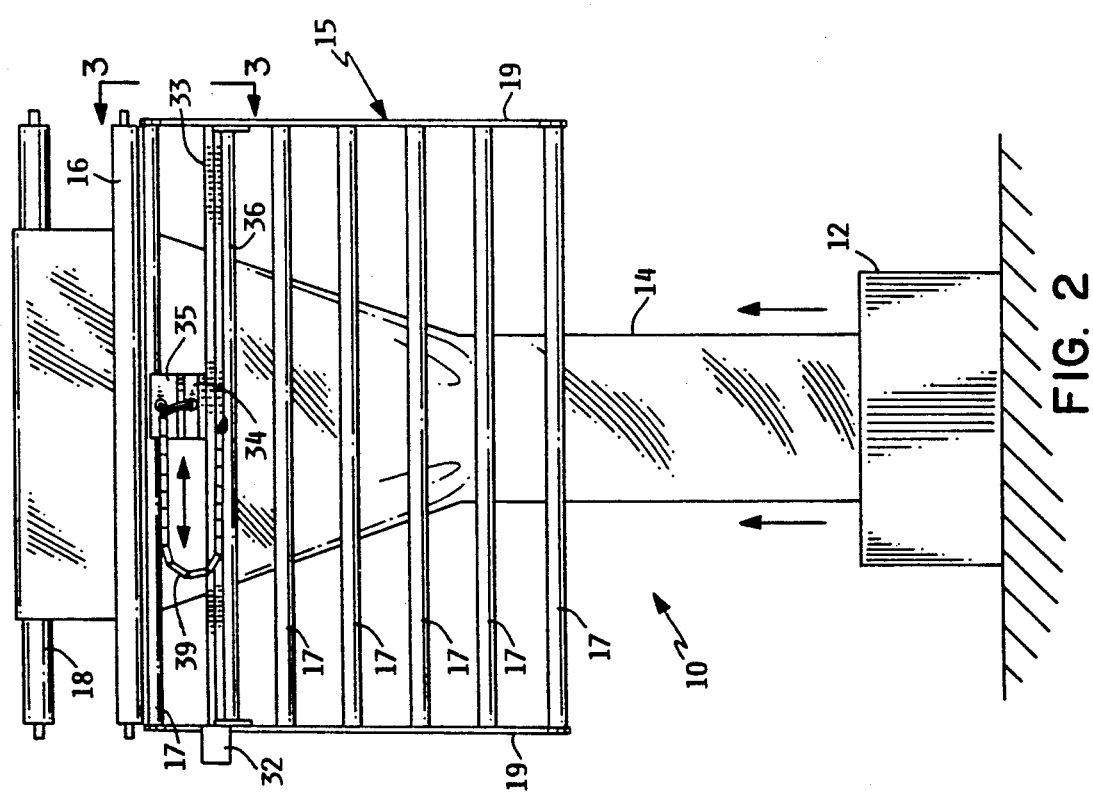
FIG. 2 shows a front elevation view of the device of FIG. 1.

The present invention includes a pair of sensor mounting assemblies 30a and 30b, each assembly mounted on the collapsing frame 15 at a point near its apex. This mounting position permits film measurements to be made at the point of blown film travel wherein film temperatures have cooled significantly, and where temperature variations across the film are significantly reduced. FIG. 2 shows a front elevation view of the machine of FIG. 1, showing the effect of the collapsing frame upon the film bubble 14. Collapsing frame 15 has a plurality of rollers 17 which extend in spaced-apart parallel arrangement between two side frames 19. One of these rollers 17 may be removed on each side of collapsing frame 15 for installation of a linear tracking assembly 30a and 30b. Linear tracking assembly 30a and 30b each comprise control electronics 32, a linear motor comprising a platen 33 and a forcer element 34, and a carriage 38. Each linear tracking system may be of a type commercially available from a source such as Parker Hannifin Corporation, Compumotor Division, Rohnert Park, Calif. A representative linear motor system is available from this supplier under Type Designation LX L20-P72. A typical linear motor system includes a stationary platen 33 which is mounted to "A" frame 15, and extends substantially entirely across the width of "A" frame 15. In a preferred embodiment, the selected platen is 72 inches in length. A movable forcer element 34 is mounted to this stationary platen, and a carriage 38 is affixed to forcer element 34, all of which is capable of moving along the entire length of the platen. The forcer element 34 may be obtained in selected styles, to provide various static force ratings, various incremental motion and speed ratings, and various load ratings. The forcer element 34 is driven by the electronic controller 32 which provides incremental drive pulses to move the forcer element along the platen. In the preferred embodiment of the present invention, a forcer element which has been utilized is designated by the Model "L20," which provides a static force of 20 pounds, and may be driven at 12,500 steps per inch with a repeatability of 0.0001 inch. This forcer element may be driven at a speed of 100 inches per second on air bearings, and can contain a bearing load of 50 pounds. The forcer element is capable of attachment to platens of up to 144 inches in length, although the preferred embodiment utilizes a 72 inch platen.

The carriage 38 is attached to the forcer 34, and a sensor 35 is affixed to the carriage. Sensor 35 is preferably a sensor manufactured by the assignee of the present invention and which is disclosed in U.S. Pat. No. 4,947,131, issued Aug. 7, 1990. This sensor has the advantage of temperature stability, and is capable of providing sensor measurements at a very high update rate, proximating 60 measurements per second. FIG. 3 shows an end view taken along the lines 3—3 of FIG. 2, to illustrate the relative positioning of the sensor heads 35a and 35b against each of the flat surfaces of the bubble 14, after the bubble 14 has been shaped by the collapsing "A" frame 15. The "A" frame rollers 17 inherently configure the bubble 14 to the relative dimension shown, and the sensor heads 35a and 35b are positioned sufficiently close to the apex of "A" frame 15 so as to enable the traversal of substantially the entire film bubble by a linear reciprocating motion. The linear motor system carries the sensor along the platen 33 at a high linear rate of speed. Sensor heads 35a and 35b may repeatedly make film thickness measurements as the sensors travel along the platen 33, so that for each linear traverse of the bubble surface a plurality of thickness measurements may be made. By placing two sensor heads 35a and 35b against the flat sides of bubble 14, data may be collected during a single linear traversal of bubble 14 to provide film thickness measurements for substantially the entire bubble. The only portion of the bubble which remains unmeasured is the relatively narrow transverse section of the bubble which travels between the apex of the "A" frame 15. If a rotatable die is used in the machine, the bubble actually rotates during the time it proceeds through the "A" frame, and this rotation eventually places all portions of the bubble in responsive contact with either of the sensors 35.

The platen 33 is affixed between side frames 19 by means of brackets 40 and a mounting tube 36. A cable 39 connects between sensor 35 and control electronics 32. The cables are mounted in a flex-track 39 which is connected at one end to the tube 36, so that the cable may be fed through the inside of tube 36 to the control electronics 32. The other end of flex track 39 is connected to carriage 38. The forward edges of sensors 35 project just beyond the "A" frame structure, so as to come into direct contact with the film which moves along the "A" frame structure.

In operation, sensor heads 35a and 35b are reciprocated back and forth along platen 33 by means of the linear motor system, and the bubble-forming process brings the upwardly traveling bubble surface into measurement contact with the sensors. The rate of linear travel of the linear motor system may be controlled, and the rate of sampling of sensor measurements may also be controlled, and a feedback system may be incorporated to cause the rate of haul off of the blown film to be regulated as a consequence of the film thickness sensor measurements being made in dynamic fashion.

In a typical blown film bubble system the film bubble as it emerges from the extruder and die achieves a diameter of about 38 inches, which translates into a circumference of about 120 inches. It is desirable to determine the thickness of the film bubble in terms of thickness per degree of circumference around the bubble; this translates to about 0.33 inches per degree of circumference. Since each of the sensors travels about 60 inches during each scan of the bubble, each sensor must make about 180 measurements per scan in order to obtain a reading for every degree of circumference.

In a typical embodiment of the invention the linear motor system and sensor is capable of making 60 measurements per second, and the total time required for a complete scan is 4-5 seconds. Therefore, the system may collect the entire 180 measurements during a single scan of the film bubble, or in a time period of 5 seconds or less. In contrast, the prior art systems utilizing movable heads have a scan rate of between 2 and 6 minutes, which means the present invention is at least 24 times faster in its ability to scan the bubble and obtain complete measurements for the entire circumference.

In an alternative embodiment of the invention the two linear motor systems may be mounted at slightly offset elevations relative to one another, so that each sensor scans along a different track of the film bubble. After several scans, this embodiment permits a measurement of a greater percentage of the total bubble area in a relatively short time.

Another alternative of the present invention would be to connect a single linear motor system to a tracking mechanism which forms a "U" about the "A" frame. This alternative would permit a single sensor to be utilized, and a single sensor would scan both sides of the linear bubble. Of course, the utilization of a single sensor will reduce the scan velocity by one half, unless the linear motor speed is adjusted.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A system for measuring thickness of blown film in a blown film machine utilizing a collapsing frame having two inclined surfaces to transform a cylindrical film bubble shape to a flattened film bubble shape, comprising:

a) a first linear motor platen affixed across one inclined surface of the collapsing frame in a direction normal to the direction of film travel, and a second linear motor platen affixed across the other inclined surface of the collapsing frame in a direction normal to the direction of film travel;

b) a linear motor forcer element engaged to each of said first and second linear motor platens;

c) a movable carriage coupled to each of said forcer elements, said carriages being movable substantially across the entire width of the collapsing frame inclined surface by said forcer elements;

d) a capacitance sensor affixed to each of the movable carriages, said sensor having a measurement head for making film thickness measurement in contact with said bubble; and e) means for moving each of said linear motor forcer elements at a rate of travel of about 15 inches per second.

2. The apparatus of claim 1, wherein each said linear motor platen is affixed across said collapsing frame at a position close to the apex of said collapsing frame.

3. A system for measuring thickness of blown film in a blown film machine utilizing an A-shaped collapsing frame to transform a rotating cylindrical film bubble shape to a flattened film bubble shape, comprising:

a) a pair of linear motor assemblies, each motor assembly affixed to a different side of the A-shaped collapsing frame, each assembly having a fixed platen element and a movable forcer element;

b) a capacitance sensor mounted to each of said forcer elements, said capacitance sensor having a sensor head for making film thickness measurement facing toward said flattened film bubble shape; and c) means for moving said forcer elements along said fixed platen to substantially traverse each side of said collapsing frame in a time increment substantially less than the time required for a complete rotation of the cylindrical film bubble.

4. The apparatus of claim 3, wherein each of said linear motor assemblies are affixed to said A-shaped collapsing frame at a position close to the apex of said A-shaped collapsing frame.

5. The apparatus of claim 4, further comprising a pair of pinch rollers positioned above the apex of said A-shaped collapsing frame.

6. The apparatus of claim 3, wherein said time increment for moving a forcer element to traverse a side of said collapsing frame is about five seconds.

7. The apparatus of claim 5, further comprising means for making capacitance sensor measurements on each sensor at the rate of approximately 60 measurements per second.

* * * * *